Jan. 28, 1930. G. R. CANNING-MARTINSSON 1,744,831
PRESS
Filed March 12, 1926   2 Sheets-Sheet 2
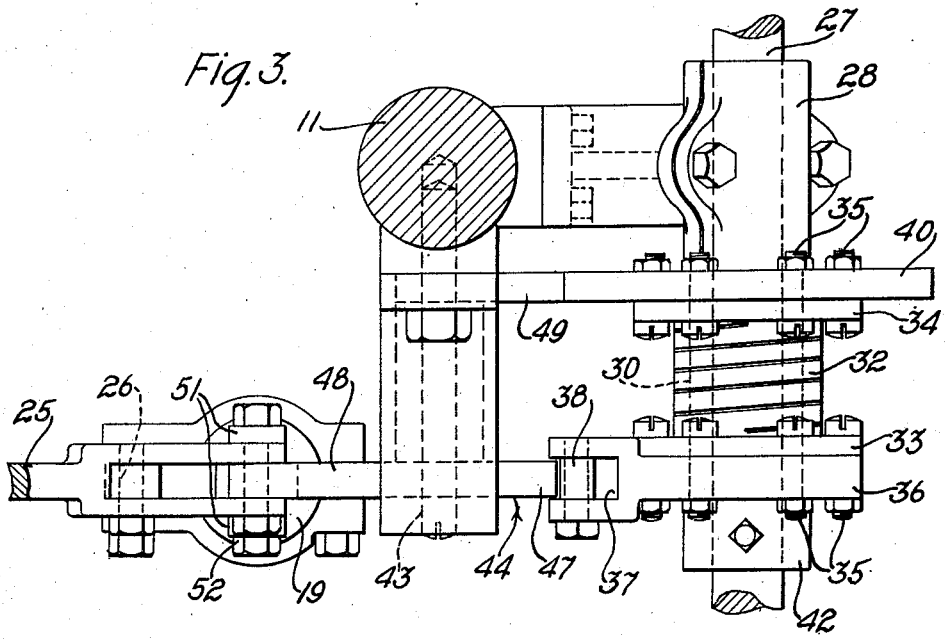
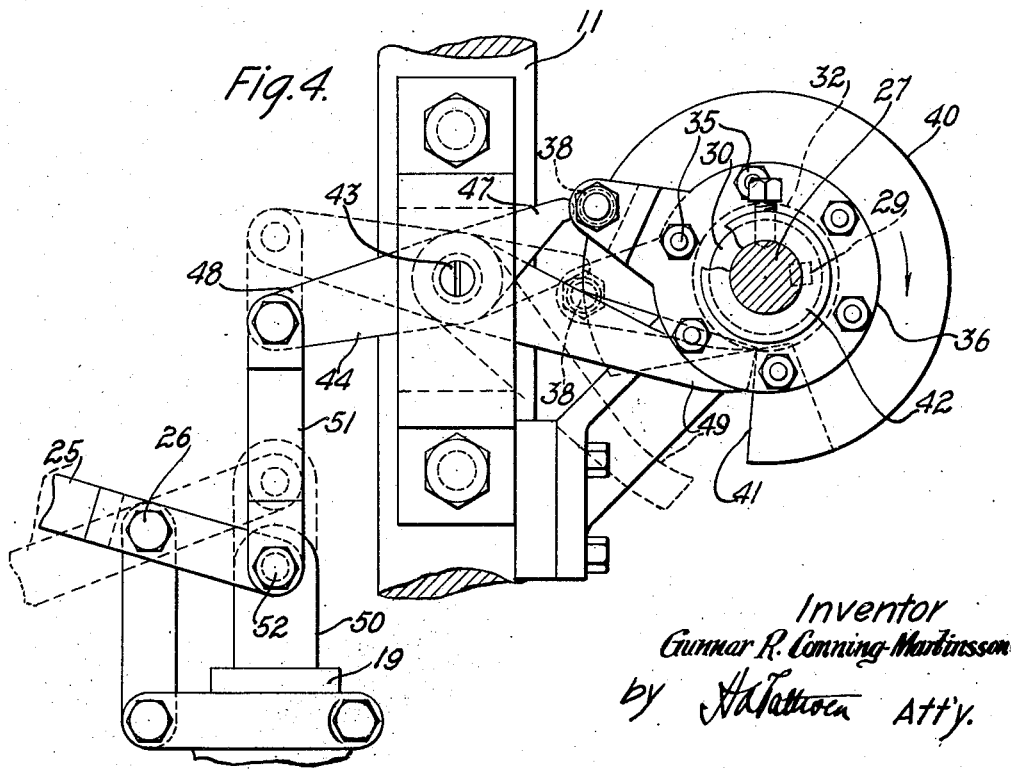
Inventor
Gunnar R. Canning-Martinsson
by  Att'y.

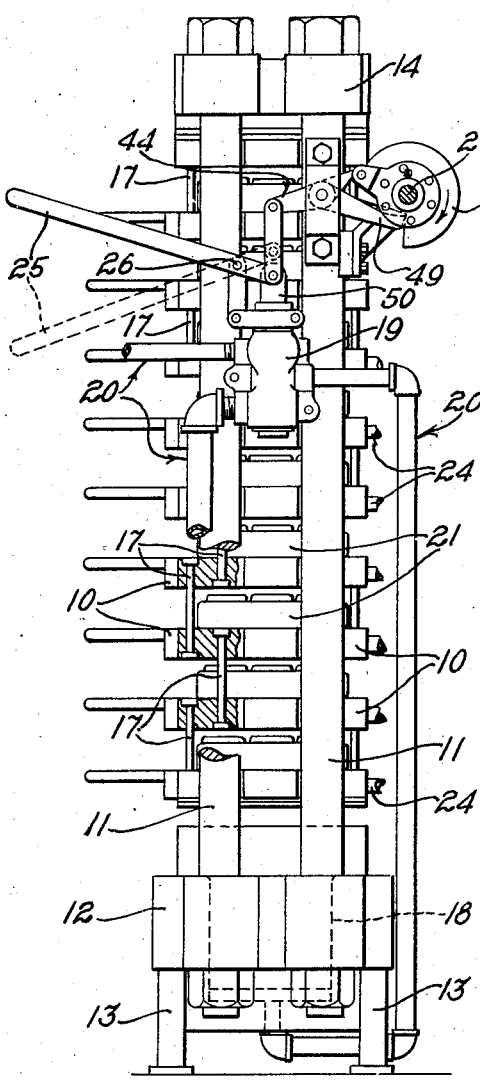
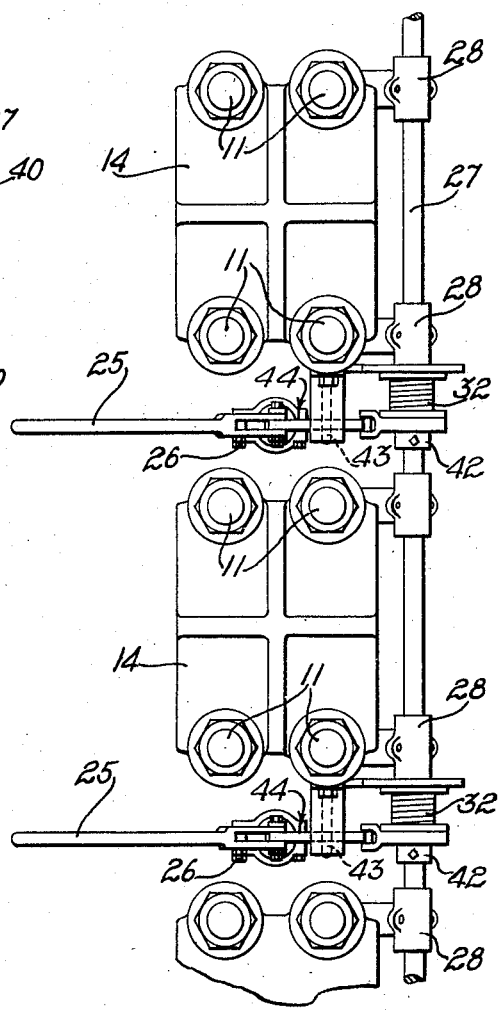

Patented Jan. 28, 1930

1,744,831

UNITED STATES PATENT OFFICE

GUNNAR ROBERT CANNING-MARTINSSON, OF RIVERSIDE, ILLINOIS, ASSIGNOR TO WESTERN ELECTRIC COMPANY, INCORPORATED, OF NEW YORK, N. Y., A CORPORATION OF NEW YORK

PRESS

Application filed March 12, 1926. Serial No. 94,204.

This invention relates to presses, and more particularly to vulcanizing and molding presses used in forming rubber articles and embodying automatic means for controlling the vulcanizing operation.

The primary object of this invention is to provide an improved means for accurately controlling the operating periods of a press of the aforementioned type, whereby articles of uniform character may be produced thereby in an efficient manner.

In accordance with one embodiment of this invention, as applied to a rubber molding and vulcanizing press, there is provided manually operable means for initiating the curing operation, which means simultaneously sets in operation timing means for interrupting the curing operation upon termination of a predetermined time interval and for preventing the opening of the press before the termination of the predetermined time interval.

Specifically there is provided, as applied to a plurality of hydraulically actuated rubber molding and vulcanizing presses, a common constantly rotating shaft carrying a plurality of encircling clutch springs, one for each of the presses, normally frictionally engaging the periphery of the shaft whereby the rotation of the latter is transmitted to the spring which at one end carries an arm freely pivoted upon the shaft. The arm through suitable levers and links controls the actuation of a hydraulic valve to cause the opening of the associated press, while a notched disc secured to the opposite end of the spring in conjunction with the levers and links prevents the opening of the press before the termination of a predetermined curing period. A hand lever individual to each press and associated with the levers and links controls the actuation of the valve to cause the closing of the associated press, and in unison therewith sets the controlling means in operation to complete another cycle.

Other objects and advantages of this invention will more fully appear from the following detailed description taken in connection with the accompanying drawings which illustrate one embodiment thereof, in which Fig. 1 is a side view, partly in section, of a hydraulically actuated rubber molding and vulcanizing press embodying this invention;

Fig. 2 is a plan view of a plurality of presses with a control mechanism embodying the features of this invention individual to each press actuated from a common driving element;

Fig. 3 is an enlarged fragmentary view thereof, partly in section; and

Fig. 4 is an enlarged fragmentary view of Fig. 1.

Referring to the drawings, the numeral 10 indicates a plurality of movable platens suitably guided in a vertical direction by four vertical columns 11 secured in a base member 12 supported upon the floor by means of legs 13. Upon the upper end of the columns 11 is a cap 14, the uppermost platen 10 being suspended therefrom by a plurality of bolts 17 with each of the balance of the platens suspended in turn from the one directly thereabove by similar bolts 17. The heads and nuts of the bolts are loosely fitted into suitable depressions formed in the top and bottom surface of the platens with the bolt shanks also loosely fitted in openings connecting the depressions, the bolts being staggered in alternate platens as clearly indicated in Fig. 1, all for the purpose, as will readily be understood, of permitting relative movement between the platens. The lowermost platen 10 responds to the movement of a plunger 18 operated in a well known manner by any suitable means, such as hydraulic pressure controlled by a valve 19 included in a pipe line, indicated generally by the numeral 20. Upon an actuation upwardly of the plunger 18 after insertion of loaded molds 21 between adjacent platens, the plunger engages the bottom of the lower platen, which in turn is raised to press the mold 21 against the next platen and so on in turn until the uppermost platen has been pressed against the bottom of the cap 14. The staggered loose bolts 17 between adjacent plates 10 permit the gradual movement of the platens upwardly to compress the molds 21 therebetween, as will readily be apparent. The platens may be maintained at a predetermined constant temperature by steam or other suitable heating agent entering suitable passages (not shown) formed in the platens for curing the molded rubber article, the steam being supplied through pipes 24 which may be connected through flexible hose (not shown) to a suitable steam supply.

In the vulcanizing or curing of molded rubber articles, particularly of articles used in connection with electrical apparatus, it is necessary that the rubber be subjected to the curing action of the heated platens while under compression between the molds for an accurately predetermined time interval so that the rubber will not be over or under cured.

The automatic controlling mechanism to be presently described is associated with a hand lever 25 adapted upon being moved counterclockwise about a stationary pivot 26 passing through the arms of a bifurcated end thereof to open the valve 19, thereby permitting the hydraulic fluid to operate the plunger 18 upwardly to close the press, as hereinbefore described. In the movement of the lever as just described, the controlling mechanism is set in operation and locked so that the operator cannot open the press prematurely but must wait until the expiration of the predetermined curing period, at which time the mechanism automatically closes the valve 19, thereby causing the press to be opened in a well known manner and returning the hand lever to its starting position, as shown in Fig. 1, and setting the mechanism for the next curing period. This mechanism will now be described.

Referring to Fig. 2, a single rotatable shaft 27 is supported in bearings 28 carried upon the columns 11, the shaft being constantly rotated at a predetermined speed from a suitable source of power through a driving means (not shown), the shaft being illustrated as serving several presses. Referring to Figs. 3 and 4, the shaft 27 at a point between each pair of presses has secured thereto by a key 29 (dotted outline) a sleeve 30. Encircling each of the sleeves 30 is a coiled clutch spring 32, normally frictionally engaging the periphery of the sleeve 30 whereby the motion of the sleeve is transmitted to the spring. Formed integral with opposite ends of the spring are flanges 33 and 34, and secured to the flange 33 by bolts 35 is a lever 36 having a bifurcated free end as indicated at 37 between the arms of which is carried a roller pin 38, the flange 34 having secured thereto by bolts 35 a disc 40 having a notch 41 in its periphery. Each of the assemblies comprising the spring 32, the lever and disc 36 and 40 respectively, which may be termed a contractile sleeve, is prevented from moving longitudinally upon the sleeve 30 by the bearing 28 adjacent one end and a collar 42 secured to the shaft 27 adjacent the opposite end. Pivotally carried upon a pin 43 supported upon the column 11 is a lever 44 provided with three arms 47, 48 and 49. The arm 48 is connected to an operating stem 50 of the valve 19 through a pair of connecting links 51, while the free end of the arm 47 lies in the path of the roller pin 38 carried by the lever 36, as clearly shown in dotted outline in Figs. 3 and 4 when the valve 19 is open. The hand lever 25, as hereinbefore described, is pivoted at its bifurcated end, as indicated at 26, the ends of the arms thereof being secured to the stem 50 of the valve 19 at a point coincident with the connection of the lower ends of the links 51 therewith, as indicated by the numeral 52. The free end of the arm 49 when the press is open is entered in the notch 41 of the disc 40, thereby preventing the assembly comprising the spring 32 and the lever and disc 36 and 40 respectively, from rotating with the shaft 27 in the direction indicated by the arrow in Fig. 4, due to the frictional engagement of the spring 32 with the periphery of the sleeve 30, as hereinbefore described. The spring 32 is coiled in a direction opposite to the direction of rotation of the sleeve 30, so that upon any retarding force being exerted against the end thereof carrying the lever 36 during the rotation of the sleeve 30 a gradual tightening of the spring throughout its length upon the sleeve will take place until the retarding force is finally overcome. As hereinbefore described, the relation of the spring 32 with the sleeve 30 is such that the spring under normal conditions is in close frictional contact with the sleeve and is driven thereby.

The operation of the controlling mechanism is as follows:

In the following description it will be assumed that the shaft 27 is rotating in the direction indicated by the arrow with the mechanism in the position indicated by full lines in Fig. 4, wherein the arm 49 is engaged in the notch 41 of the disc 40 and in which position the spring has been uncoiled a sufficient amount to release its normal grip upon the rotating sleeve 30. The operator upon inserting the loaded molds between adjacent platens rocks the hand lever 25 downwardly to the position indicated in dotted outline in Fig. 1, thereby opening the hydraulic valve 19 to permit the hydraulic medium to press downwardly upon the plunger 18 to cause the molds to be compressed between adjacent platens. Simultaneously with this movement of the lever 25, through the associated links 51, the lever 44 is rocked clockwise about the pivot pin 43 to withdraw the arm 49 thereof from the notch 41, thereby removing the retarding force from the spring 32 and permitting it to normally engage the driving sleeve 30. This last operation serves to set the controlling mechanism in operation. The arm 47 is at the same time rocked clockwise to the dotted outline position thereof indicated in Fig. 4, wherein it will lie in the path of the advancing roller pin 38. The press now being closed and the timing or controlling mechanism in motion the free end of the arm 49 is positioned, as clearly shown in dotted outline on Fig. 4, with the free end thereof adjacent the peripheral surface of the rotating disc 40. In this position the hand lever 25 cannot be rocked clockwise by the operator to open the platens, the movement of the arm 49 being limited by the peripheral surface of the disc 40 as will readily be apparent. The spring 32 with the lever 36 and disc 40 will now rotate in the direction indicated by the arrow until the roller pin 38 contacts with the arm 47, and as the shaft 27 continues to rotate the resistance offered by the arm 47 serves to cause a gradual tightening of the spring throughout its length and a greater contraction thereof about the sleeve 30 and thereby holding more tightly thereto. This results in the lever 36 finally overcoming the resistance offered by the arm 47 and causes a counter-clockwise rotation of the lever 44 about the pivot pin 43, which in turn causes the valve 19 to be closed and returns the hand lever 25 to its normal or starting position, as will readily be understood. As the arm 47 moves upwardly under the action of the advancing roller pin 38 the arm 49 is rocked counter-clockwise into the approaching notch 41, and by the time the roller 38 rides off the arm 47 the arm 49 has reached the position in the notch 41 indicated in full outline in Fig. 4, whereupon the resistance offered by the arm 49 entered within the notch 41 of the disc 40 attached to the opposite end of the spring serves to expand the spring, as will readily be apparent, sufficiently to cause it to release its normal grip upon the sleeve 30. In this position the mechanism is ready to repeat the cycle of operation, as hereinbefore described, upon rocking the hand lever 25 downward.

It will be evident from the foregoing description that this invention is particularly adapted to the manufacture of vulcanized rubber articles, wherein it is vital that the curing period extend over an accurately predetermined timed interval so as to prevent over or under curing of the articles.

Furthermore, that a press equipped with this controlling mechanism is very efficient and reliable in that it can only be closed by manual actuation of the lever 25, thereby minimizing the probability that the press during the loading of the molds between the platens will not be closed by the operator, that the curing period cannot be shortened or lengthened over the predetermined time for which the mechanism has been set, and that upon termination of the predetermined period the press is automatically opened and the mechanism set for the next cycle of operations, the operator merely being required to position upon and remove the loaded molds from the platens and rock the hand lever 25 downwardly upon the press being loaded. It will also be evident that the mechanism is particularly adapted for use with a battery of presses, in that a common constantly rotating shaft may furnish driving power for a controlling mechanism individual to each press independently of all other controlling mechanisms associated with the other presses in the battery. With the latter arrangement each press may be independently closed and opened but the periods of operation thereof will be of uniform duration, thus insuring that the articles being formed will be of uniform character.

What is claimed is:

1. In a mechanism for vulcanizing material, manually controlled means for rendering the mechanism effective, a rotary element, yieldable means adapted to be intermittently and frictionally engaged therewith, and means interconnecting the manually controlled means and the latter means in such manner that upon actuation of the former means the latter means is simultaneously connected to said rotary element for a predetermined time interval and upon disconnection therefrom operating the manually controlled means in a reverse direction to render the mechanism ineffective.

2. In a hydraulic mechanism for vulcanizing material, a valve for controlling a fluid supply thereto, manually controlled means for operating the valve in one direction, a constantly moving element, means designed to be intermittently driven thereby, means interconnecting the manually controlled means and the latter means in such manner that upon actuation of the former means the latter means is simultaneously connected to said moving element for a predetermined time interval and upon disconnection therefrom causing a reverse operation of said manually controlled means to operate the valve in the opposite direction, and means associated with the intermittently driven means and the interconnecting means and rendered automatically effective upon actuation of the manually controlled means for preventing a subsequent actuation of the manually controlled means before the disconnection of the intermittently driven means with the moving element.

3. In a press, means for operating the press, manually controlled means for rendering the latter means effective, a constantly rotating shaft having a sleeve affixed thereto, a contractile sleeve carried thereon designed for intermittent rotation therewith, a disc secured to one end of the sleeve, a radially disposed arm secured to the opposite end of the sleeve, means interconnecting the manually controlled means and said disc and arm in such manner that upon actuation of the former means the sleeve simultaneously grips the constantly rotating sleeve and rotates therewith for a predetermined time interval and upon release of the sleeve operates the manually controlled means in a reverse direction to return the press to its inoperative position, the release being effective by the arm engaging the interconnecting means, and an arm carried by and operable with said interconnecting means positioned adjacent the periphery of the disc, the disc and said latter arm co-operating during the time interval to prevent return of the press to its inoperative position before expiration of the time interval, said disc provided with a notch which co-operates with the latter arm upon restoration of the manually controlled means and the press to their inoperative positions to prevent rotation of the sleeve with said rotating shaft.

4. In a mechanism for vulcanizing material, hydraulic means for associating the members of the mechanism with each other to vulcanize material associated therewith, manually controlled means for rendering the hydraulic means effective, a driving element, means designed to be intermittently driven thereby, and means interconnecting the manually controlled means and the intermittently driven means effective upon actuation of the manually controlled means to simultaneously connect the driven and driving elements for a predetermined time interval and upon disconnection therefrom operates the manually controlled means in a reverse direction to cause dissociation of said members.

In witness whereof, I hereunto subscribe my name this 26th day of February A. D., 1926.

GUNNAR ROBERT CANNING-MARTINSSON.